United States Patent
Jiang et al.

(10) Patent No.: US 10,510,252 B2
(45) Date of Patent: Dec. 17, 2019

(54) SYSTEM AND METHOD THAT FACILITATES BEAMFORMING FROM A VEHICLE USER EQUIPMENT

(71) Applicant: QUALCOMM Incorporated, San Diego, CA (US)

(72) Inventors: Libin Jiang, Bridgewater, NJ (US); Shailesh Patil, Raritan, NJ (US); Junyi Li, Chester, NJ (US); Georgios Tsirtsis, London (GB); Zhibin Wu, Bedminster, NJ (US); Kapil Gulati, Dover, DE (US); Sudhir Kumar Baghel, Bridgewater, NJ (US); Tien Viet Nguyen, Bridgewater, NJ (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 112 days.

(21) Appl. No.: 15/706,558

(22) Filed: Sep. 15, 2017

(65) Prior Publication Data
US 2018/0075746 A1   Mar. 15, 2018

Related U.S. Application Data

(60) Provisional application No. 62/395,323, filed on Sep. 15, 2016.

(51) Int. Cl.
H04B 7/00        (2006.01)
G08G 1/16        (2006.01)
(Continued)

(52) U.S. Cl.
CPC ....... G08G 1/161 (2013.01); G08G 1/096791 (2013.01); H04B 7/0408 (2013.01);
(Continued)

(58) Field of Classification Search
CPC ............ G08G 1/096791; G08G 1/161; H04B 7/0408; H04B 7/0617; H04L 12/12; H04W 84/005
See application file for complete search history.

(56) References Cited

U.S. PATENT DOCUMENTS 9,376,214 B2      6/2016  Ghoshal
10,129,862 B1 *  11/2018  Wu ..................... H04W 72/042
(Continued)

FOREIGN PATENT DOCUMENTS

WO       2014036150 A1     3/2014
WO    WO-2016086144 A1    6/2016

OTHER PUBLICATIONS

Partial International Search Report—PCT/US2017/051915—ISA/EPO —dated Dec. 17, 2017.
(Continued)

Primary Examiner — Minh Trang T Nguyen
(74) Attorney, Agent, or Firm — Loza & Loza, LLP

(57) ABSTRACT

Aspects of the disclosure relate to beamforming from a vehicle user equipment (UE). In a first aspect, a beamform vector is selected based on beamform data received from a scheduling entity. Here, the beamform data corresponds to a path between a vehicle UE and a base station or another vehicle, and the beamform vector includes respective phases and amplitudes corresponding to each of a plurality of antennas of the vehicle UE. A beam is then generated in accordance with the beamform vector. In another aspect, a database of beamform data is maintained, and beamform data from the database is retrieved. Here, the retrieved beamform data corresponds to a particular location pair that includes a first location associated with a location of a vehicle UE, and a second location associated with a location
(Continued)

of a base station or another vehicle. The beamform data is then transmitted to the vehicle UE.

16 Claims, 14 Drawing Sheets

(51) Int. Cl.
*G08G 1/0967* (2006.01)
*H04B 7/0408* (2017.01)
*H04L 12/12* (2006.01)
*H04W 84/00* (2009.01)
*H04B 7/06* (2006.01)

(52) U.S. Cl.
CPC ........... *H04B 7/0617* (2013.01); *H04L 12/12* (2013.01); *H04W 84/005* (2013.01)

(56) References Cited

U.S. PATENT DOCUMENTS

| | | | |
|---|---|---|---|
| 2010/0157924 A1* | 6/2010 | Prasad | H04W 52/346 370/329 |
| 2013/0286960 A1 | 10/2013 | Li et al. | |
| 2014/0339356 A1 | 11/2014 | Deakin et al. | |
| 2016/0305367 A1 | 10/2016 | Ghoshal | |
| 2017/0005250 A1 | 1/2017 | Hiller | |
| 2017/0126150 A1 | 5/2017 | Wang | |
| 2017/0244451 A1* | 8/2017 | Raghavan | H04B 7/0408 |
| 2017/0288769 A1* | 10/2017 | Miller | H04B 7/212 |

OTHER PUBLICATIONS

International Search Report and Written Opinion—PCT/US2017/051915—ISA/EPO—dated Mar. 12, 2018.

* cited by examiner

SYSTEM AND METHOD THAT FACILITATES BEAMFORMING FROM A VEHICLE USER EQUIPMENT

CROSS-REFERENCE TO RELATED APPLICATION

This application claims priority to and the benefit of U.S. Provisional Patent Application No. 62/395,323, filed on Sep. 15, 2016, the entire content of which is incorporated herein by reference as if fully set forth below in its entirety and for all applicable purposes.

TECHNICAL FIELD

The technology discussed below relates generally to wireless communication systems, and more particularly, to beamforming from a vehicle user equipment.

INTRODUCTION

Connected vehicles have become a technology trend. In response to this trend, future vehicles will likely require high-data-rate wireless connections with base stations and/or other vehicles. Moreover, as the demand for mobile broadband access in vehicles continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) network as that term is defined by the next generation mobile networks (NGMN) alliance. As it stands today, this 5G network may exhibit a higher degree of flexibility and scalability than LTE, and is envisioned to support very diverse sets of requirements. Therefore, an efficient and flexible manner for vehicles to communicate with base stations and/or other vehicles is desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example a method of wireless communication from a vehicle user equipment (UE) to a base station or other vehicle is disclosed. The method includes receiving beamform data via a network from a scheduling entity, and selecting a beamform vector based on the beamform data received from the scheduling entity. Within such embodiment, the beamform data corresponds to a mapping of a path between a vehicle UE and a base station or another vehicle, and the beamform vector includes a respective phase and amplitude corresponding to each of a plurality of antennas coupled to the vehicle UE. The method further includes generating a beam in accordance with the beamform vector such that the beam has a direction consistent with the path between the vehicle UE and the base station or another vehicle.

In a second example, a wireless communication device is disclosed, which includes a processor communicatively coupled to a memory, a transceiver, a beamform data circuitry, a beamform vector selection circuitry, and a beam generation circuitry. For this example, the beamform data circuitry is configured to receive beamform data via a network from a scheduling entity, whereas the beamform vector selection circuitry is configured to select a beamform vector based on the beamform data received from the scheduling entity. Within such embodiment, the beamform data corresponds to a mapping of a path between a vehicle UE and a base station or another vehicle, and the beamform vector includes a respective phase and amplitude corresponding to each of a plurality of antennas coupled to the vehicle UE. The beam generation circuitry is then configured to generate a beam in accordance with the beamform vector such that the beam has a direction consistent with the path between the vehicle UE and the base station or another vehicle.

In a third example, a method of wireless communication from a scheduling entity to a vehicle UE is disclosed. The method includes maintaining a database of beamform data corresponding to paths between a plurality of location pairs, and retrieving beamform data from the database corresponding to a particular location pair. Within such example, the particular location pair includes a first location associated with a location of a vehicle user equipment (UE), and a second location associated with a location of a base station or another vehicle. The method further includes transmitting the beamform data corresponding to the particular location pair to the vehicle UE.

In a fourth example, another wireless communication device is disclosed, which includes a processor communicatively coupled to a memory, a transceiver, a beamform database circuitry, a retrieval circuitry, and a beamform data transmission circuitry. For this example, the beamform database circuitry is configured to maintain a database of beamform data corresponding to paths between a plurality of location pairs, whereas the retrieval circuitry is configured to retrieve beamform data from the database corresponding to a particular location pair. Here, the particular location pair includes a first location associated with a location of a vehicle user equipment (UE), and a second location associated with a location of a base station or another vehicle. The beamform data transmission circuitry is then configured to transmit the beamform data corresponding to the particular location pair to the vehicle UE.

For each of the examples disclosed herein, it should be noted that different vehicles may use different beamform vectors to generate a substantially similar beam, since different vehicles have different form factors. Moreover, the beamform vector of one vehicle may not be appropriate for another vehicle, unless the two vehicles are of the same model (i.e., same form factor) and have the same antenna array configuration (i.e., same spatial separation). Accordingly, as used herein, it should be appreciated that "beamform data" generally includes data corresponding to a beam (e.g., direction, magnitude, etc.), whereas a "beamform vector" generally corresponds to vehicle-specific parameters used to create such a beam (e.g., a respective phase and amplitude corresponding to each of a plurality of antennas coupled to a particular vehicle).

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
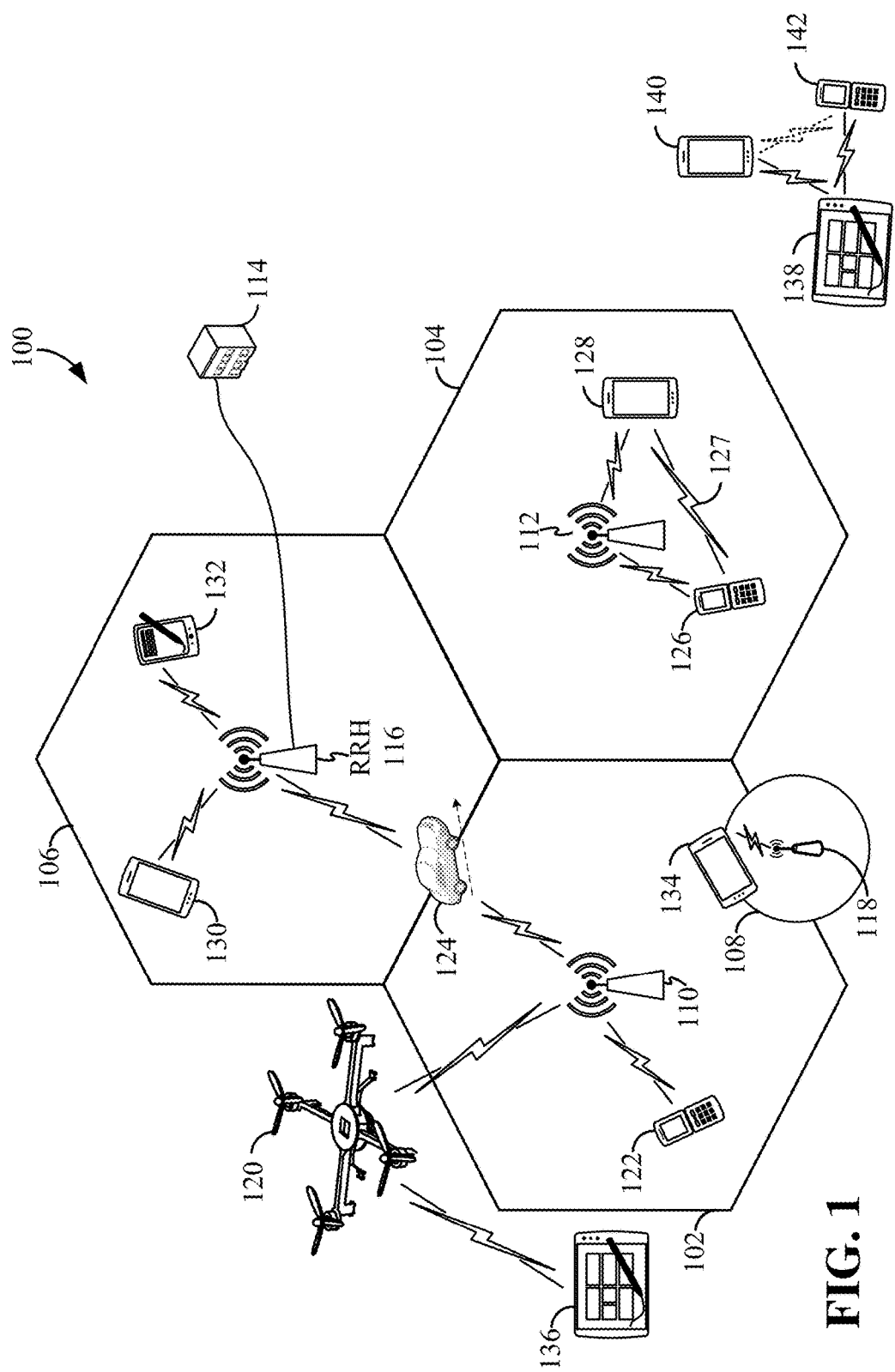
FIG. 1 is a conceptual diagram illustrating an example of a radio access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Overview

As previously stated, in response to the increasing popularity of connected vehicle technology, it is anticipated that future vehicles will require high-data-rate wireless connections with base stations and/or other vehicles. To this end, it should be noted that a vehicle user equipment (UE) has several distinctive features relative to handheld devices. First, it has a large form factor and can be equipped with more antennas than handheld devices. For example, 6-8 antennas can be placed on the rooftop, hood, and left/right mirrors with large spatial separation. Second, when coupled with a global positioning system (GPS), a vehicle UE can measure and predict the vehicle's location, speed, and trajectory with higher accuracy. Third, communication with vehicle UEs requires low latency and high reliability for safety-related applications (e.g., collision avoidance systems).

Aspects disclosed herein are directed towards various beamforming designs that improve the data rate and reliability of vehicle communications. Beamforming (aka "spatial filtering") is a signal processing technique used in sensor arrays for directional signal transmission or reception. This is achieved by combining elements in an antenna array such that signals at particular angles experience constructive interference while others experience destructive interference.

In a particular aspect disclosed herein, features of a vehicle UE are utilized to generate a beam directed towards a particular direction based on beamform data received from a scheduling entity. To control the direction of such a beam, the vehicle UE selects a beamform vector based on the beamform data, wherein the beamform vector includes a phase and relative amplitude of a signal at each of a plurality of antennas on the vehicle, which collectively creates a pattern of constructive and destructive interference in a wavefront. Since a vehicle UE knows the position, speed, and future trajectory of the vehicle, this information can be utilized to improve beamforming when communicating with a base station. For example, if the vehicle UE is further equipped with a map of the deployed base stations, then the vehicle UE may also know the position of the base station it is communicating with. Based on the relative position between the vehicle UE and a particular base station, the vehicle UE can adjust the respective amplitudes and phases of the signals transmitted by the plurality of antennas (i.e., the "beamforming vector") such that the particular base station the vehicle UE is communicating with receives the strongest combined signal. Here, it should be noted that a mapping between a beamforming vector and the resulting radiation pattern (i.e., the pattern of combined signal strengths in different directions) can be measured and determined beforehand by the vehicle UE (e.g., mapping may be stored in a lookup table). When communicating with a base station, the appropriate beamforming vector may then be chosen based on the relative position of the base station and the vehicle.

The aforementioned beamforming techniques can be similarly applied to communications with a second vehicle UE. Here, it is contemplated that a first vehicle UE may know the position of the second vehicle via vehicle-to-vehicle communications (e.g., where each vehicle UE broadcasts information of its position, speed, etc.) or via computer vision using a camera. If the first vehicle UE desires to communicate specifically with a second vehicle UE, it can thus beamform its transmission to the second vehicle UE by using a beamforming vector in which the resulting radiation pattern is directed towards the second vehicle UE.

In another aspect of the disclosure, it is contemplated that a vehicle UE may be configured to use a topological map of the area to perform "ray tracing" between itself and base stations/other vehicles to tune the beamforming vectors accordingly. Here, it should be appreciated that ray tracing is a method for calculating the path of waves or particles through a system with regions of varying propagation velocity, absorption characteristics, and reflecting surfaces. Under these circumstances, wavefronts may bend, change direction, or reflect off surfaces, complicating analysis. Ray tracing solves this problem by repeatedly advancing idealized narrow beams called rays through the medium by discrete amounts. Therefore, given a detailed map of major objects (such as buildings) in a particular area, ray tracing analyses can be performed by taking into account the topology and surface properties of the objects. For example, in a complex surrounding, the vehicle UE can analyze the received strength of a ray (transmitted towards a particular direction) through commercially available ray-tracing simulation software. In a particular example, the vehicle UE may be equipped with a topological map of the environment, wherein the vehicle UE knows that a building is obstructing it from a base station. In response, the vehicle UE ascertains an indirect path to the base station, wherein a beam generated by the vehicle UE is directed towards another building so as to create a reflected beam directed towards the desired base station.

In yet another aspect of the disclosure, it is contemplated that a scheduling entity may be configured to provide a vehicle UE with beamform data stored in a database maintained by the scheduling entity. Namely, it is contemplated that the scheduling entity may be configured to crowdsource such a database according to data associated with previous beam transmissions from various vehicles.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Beamforming: directional signal transmission or reception. For a beamformed transmission, the amplitude and phase of each antenna in an array of antennas may be precoded, or controlled to create a desired (i.e., directional) pattern of constructive and destructive interference in a wavefront.

Exemplary Radio Access Network

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality, and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
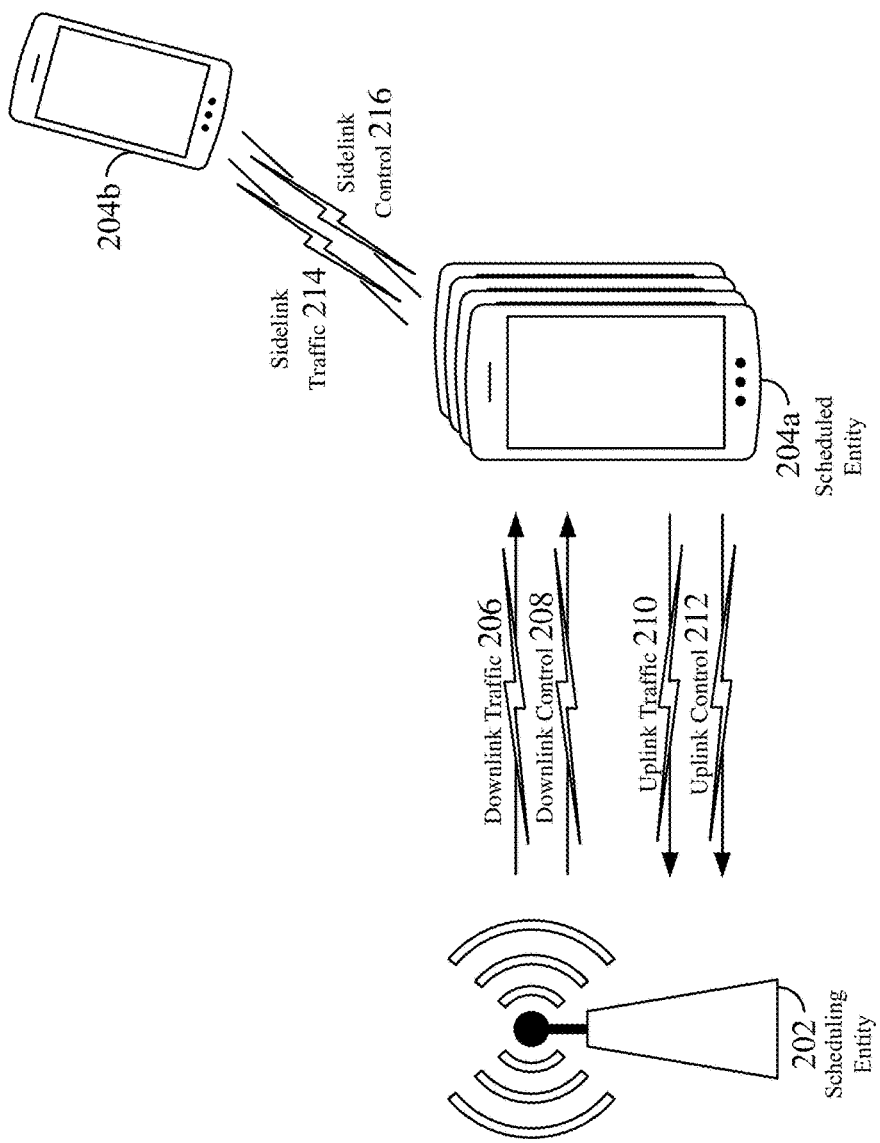
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 202 and scheduled entities 204 may include suitable hardware and capabilities (e.g., an encoder, a decoder, and/or a CODEC) to utilize one or more of these channel codes for wireless communication.

The channels or carriers described above and illustrated in FIG. 2 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

The air interface in the radio access network 100 may utilize one or more multiplexing and multiple access algorithms to enable simultaneous communication of the various devices. For example, 5G NR specifications provide multiple access for uplink (UL) or reverse link transmissions from UEs 122 and 124 to base station 110, and for multiplexing for downlink (DL) or forward link transmissions from base station 110 to one or more UEs 122 and 124, utilizing orthogonal frequency division multiplexing access (OFDM) with a cyclic prefix (CP). In addition for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Moreover, the physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Exemplary Scheduling Entity

Figure 3:
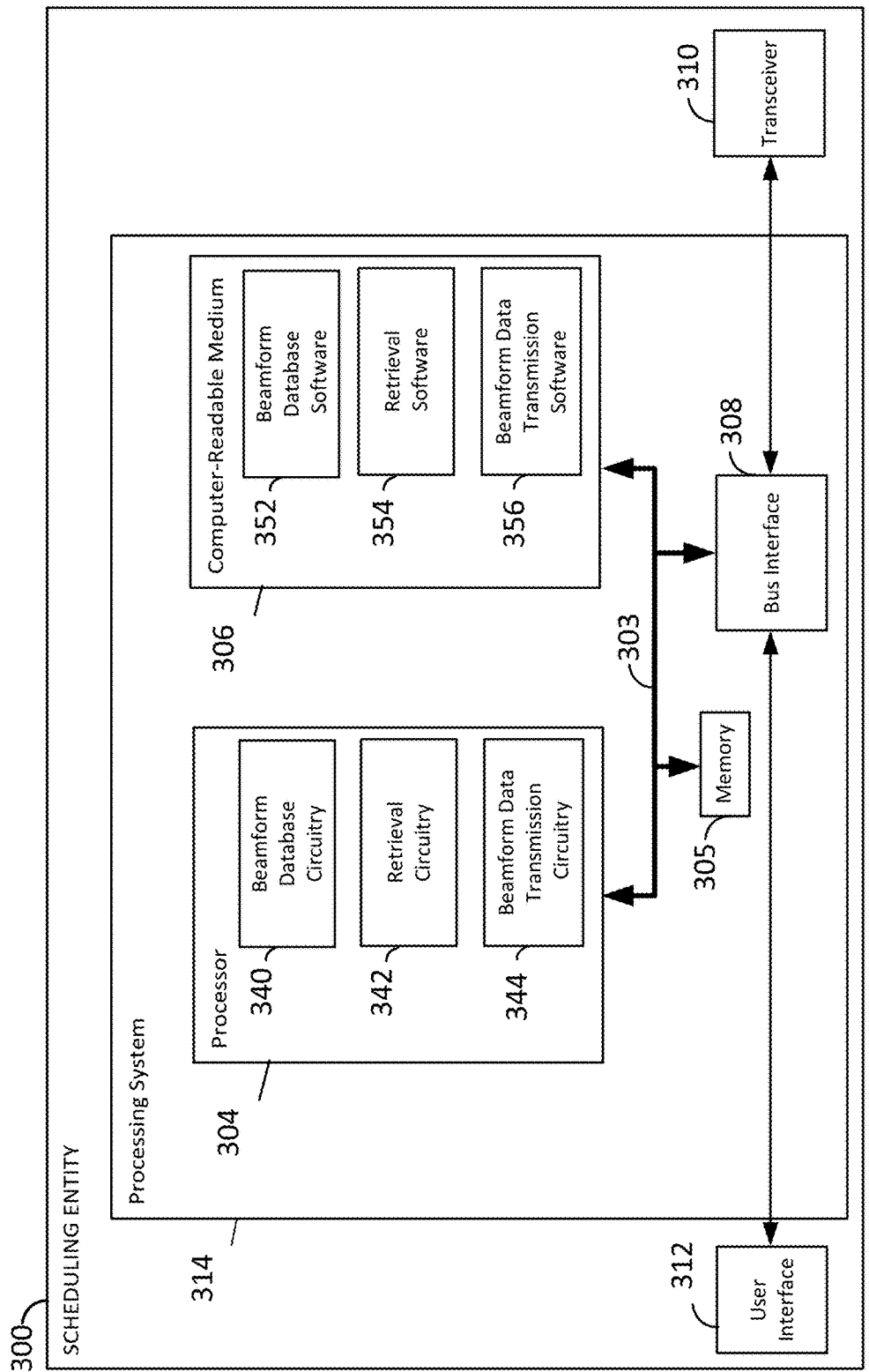
FIG. 3 is a block diagram illustrating an example of a hardware implementation for a scheduling entity employing a processing system.

FIG. 3 is a block diagram illustrating an example of a hardware implementation for a scheduling entity 300 employing a processing system 314. For example, the scheduling entity 300 may be a user equipment (UE) as illustrated in any one or more of the FIGs. disclosed herein. In another example, the scheduling entity 300 may be a base station as also illustrated in any one or more of the FIGs. disclosed herein.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIG. 4.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include a beamform database circuitry 340 configured for various functions, including, for example, to maintain a database of beamform data corresponding to paths between a plurality of location pairs. As illustrated, the processor 304 may also include retrieval circuitry 342 configured for various functions. For instance, retrieval circuitry 342 may be configured to retrieve beamform data from the database corresponding to a particular location pair. Here, it is contemplated that the particular location pair includes a first location associated with a location of a vehicle UE, and a second location associated with a location of a base station or another vehicle. The processor 304 may further include beamform data transmission circuitry 344 configured for various functions, including, for example, to transmit the beamform data corresponding to the particular location pair to the vehicle UE. To this end, it should be appreciated that, the combination of the beamform database circuitry 340, the retrieval circuitry 342, and the beamform data transmission circuitry 344 may be configured to implement one or more of the functions described herein.

Various other aspects for scheduling entity 300 are also contemplated. For instance, as discussed in more detail below with reference to FIGS. 13-14, scheduling entity 300 may be configured to crowdsource the database of beamform data according to data associated with previous beam transmissions from various vehicles. In a particular example, the beamform database circuitry 340 may thus be configured to update the database based on beamform settings received from vehicles respectively located in any of a plurality of locations. For instance, the beamform database circuitry 340 may be configured to update the database based on a performance associated with beamform settings, such as a real-time measurement associated with a communication between a vehicle UE and a base station or another vehicle facilitated by the beamform settings.

In another aspect of the disclosure, it is contemplated that the beamform database circuitry 340 may be configured to store beamform data that includes data corresponding to an indirect path between the vehicle UE and the base station or another vehicle (e.g., an indirect path comprising at least one reflection off an object). Furthermore, it is contemplated that the beamform database circuitry 340 may be configured to store beamform data that includes data corresponding to a plurality of paths between the vehicle UE and the base station or another vehicle. Within such embodiment, the beamform database circuitry 340 may be further configured to store beamform data that includes a prioritization of the plurality of paths, wherein such prioritization provides a vehicle UE with a hierarchy of paths from which to select a corresponding beamforming vector.

Referring back to the remaining components of scheduling entity 300, it should be appreciated that the processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include beamform database software 352 configured for various functions, including, for example, to maintain a database of beamform data corresponding to paths between a plurality of location pairs. As illustrated, the computer-readable storage medium 306 may also include retrieval software 354 configured for various functions. For instance, the retrieval software 354 may be configured to retrieve beamform data from the database corresponding to a particular location pair. Here, it is contemplated that the particular location pair includes a first location associated with a location of a vehicle UE, and a second location associated with a location of a base station or another vehicle. The computer-readable storage medium 306 may further include beamform data transmission software 356 configured for various functions, including, for example, to transmit the beamform data corresponding to the particular location pair to the vehicle UE.

It should be appreciated that the combination of the beamform database software 352, the retrieval software 354, and the beamform data transmission software 356 may be configured to implement one or more of the functions described herein. For instance, as previously stated, scheduling entity 300 may be configured to crowdsource the database of beamform data according to data associated with previous beam transmissions from various vehicles. In a particular example, the beamform database software 352 may thus be configured to update the database based on beamform settings received from vehicles respectively located in any of a plurality of locations. For instance, the beamform database software 352 may be configured to update the database based on a performance associated with beamform settings, such as a real-time measurement associated with a communication between a vehicle UE and a base station or another vehicle facilitated by the beamform settings.

In another aspect of the disclosure, it is contemplated that the beamform database software 352 may be configured to store beamform data that includes data corresponding to an indirect path between the vehicle UE and the base station or another vehicle (e.g., an indirect path comprising at least one reflection off an object). Furthermore, it is contemplated that the beamform database software 352 may be configured to store beamform data that includes data corresponding to a plurality of paths between the vehicle UE and the base station or another vehicle. Within such embodiment, the beamform database software 352 may be further configured to store beamform data that includes a prioritization of the plurality of paths, wherein such prioritization provides a vehicle UE with a hierarchy of paths from which to select a corresponding beamforming vector.

In a particular configuration, it is also contemplated that the scheduling entity 300 includes means for maintaining a database of beamform data, means for retrieving beamform data from the database, and means for transmitting the beamform data. In one aspect, the aforementioned means may be the processor(s) 304 configured to perform the functions recited by the aforementioned means. In another aspect, the aforementioned means may be a circuit or any apparatus configured to perform the functions recited by the aforementioned means.

Figure 4:
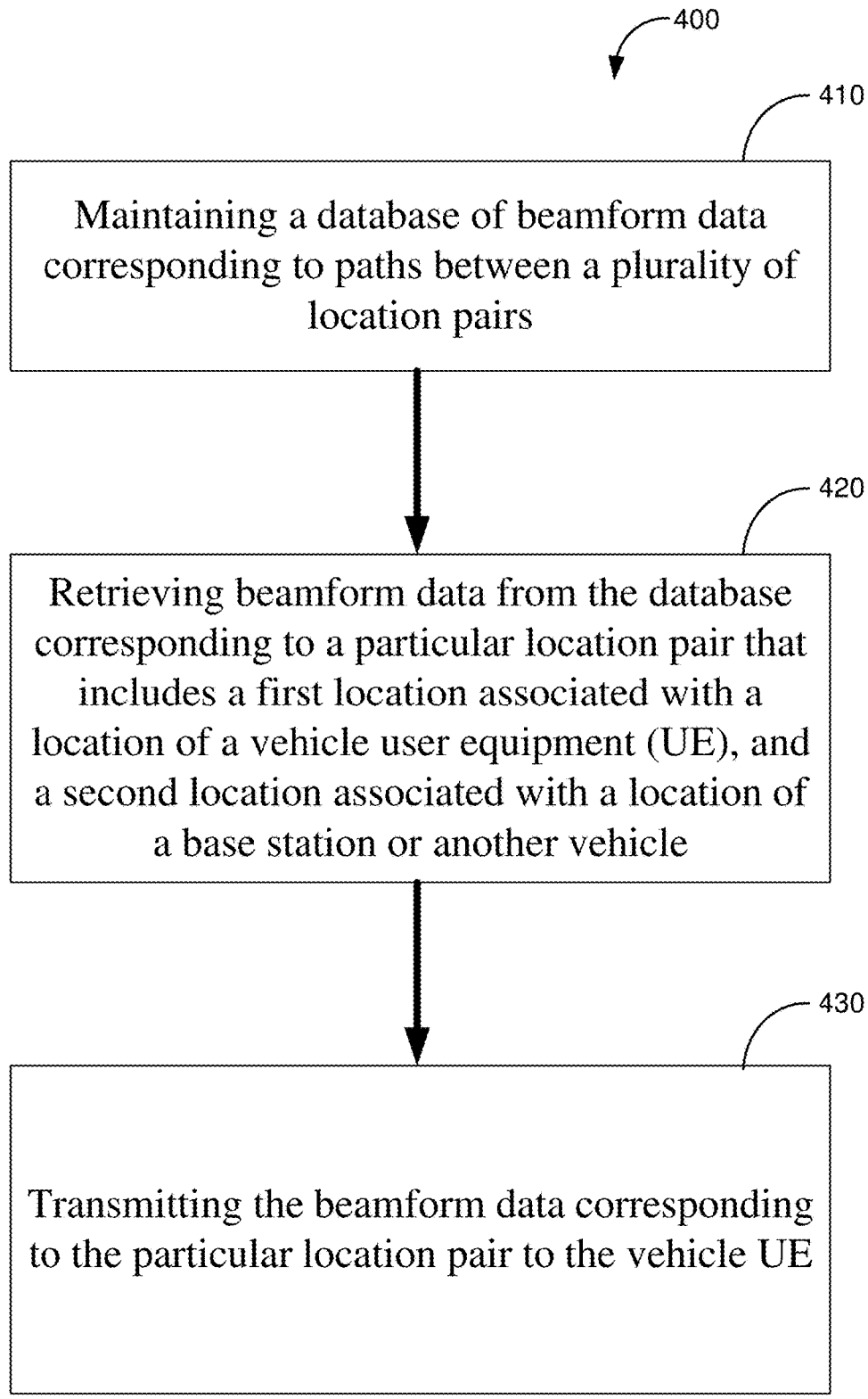
FIG. 4 is a flow chart illustrating an exemplary scheduling entity process that facilitates generating a beam according to some aspects of the disclosure.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described herein and utilizing, for example, the processes and/or algorithms described in relation to FIG. 4.

In FIG. 4, a flow chart is provided, which illustrates an exemplary scheduling entity process that facilitates generating a beam according to some aspects of the disclosure. As described below, some or all illustrated features may be omitted in a particular implementation within the scope of the present disclosure, and some illustrated features may not be required for implementation of all embodiments. In some examples, the process 400 may be carried out by the scheduling entity 300 illustrated in FIG. 3. In some examples, the process 400 may be carried out by any suitable apparatus or means for carrying out the functions or algorithm described below.

Process 400 begins at block 410 with the maintaining of a database of beamform data corresponding to paths between a plurality of location pairs. Here, since it is contemplated that the scheduling entity 300 may be configured to crowdsource the database of beamform data, the maintaining performed at block 410 may further comprise updating the database based on beamform settings received from vehicles respectively located in any of a plurality of locations. For instance, such updating may include updating the database based on a performance associated with beamform settings, such as a real-time measurement associated with a communication between a vehicle UE and a base station or another vehicle facilitated by the beamform settings.

In another aspect of the disclosure, as previously stated, it is contemplated that the database maintained at block 410 may include data corresponding to an indirect path between the vehicle UE and the base station or another vehicle (e.g., an indirect path comprising at least one reflection off an object). Furthermore, it is contemplated that the maintaining performed at block 410 may include storing beamform data that includes data corresponding to a plurality of paths between the vehicle UE and the base station or another vehicle. Within such embodiment, the maintaining performed at block 410 may further include storing beamform data that includes a prioritization of the plurality of paths, wherein such prioritization provides a vehicle UE with a hierarchy of paths from which to select a corresponding beamforming vector.

In addition to the maintaining performed at block 410, process 400 includes block 420 where beamform data corresponding to a particular location pair is retrieved from the database. Here, the particular location pair includes a first location associated with a location of a vehicle UE, and a second location associated with a location of a base station or another vehicle. After retrieving the beamform data at block 420, process 400 then concludes at block 430 where the retrieved beamform data is then transmitted to the vehicle UE.

Exemplary Scheduled Entity

Figure 5:
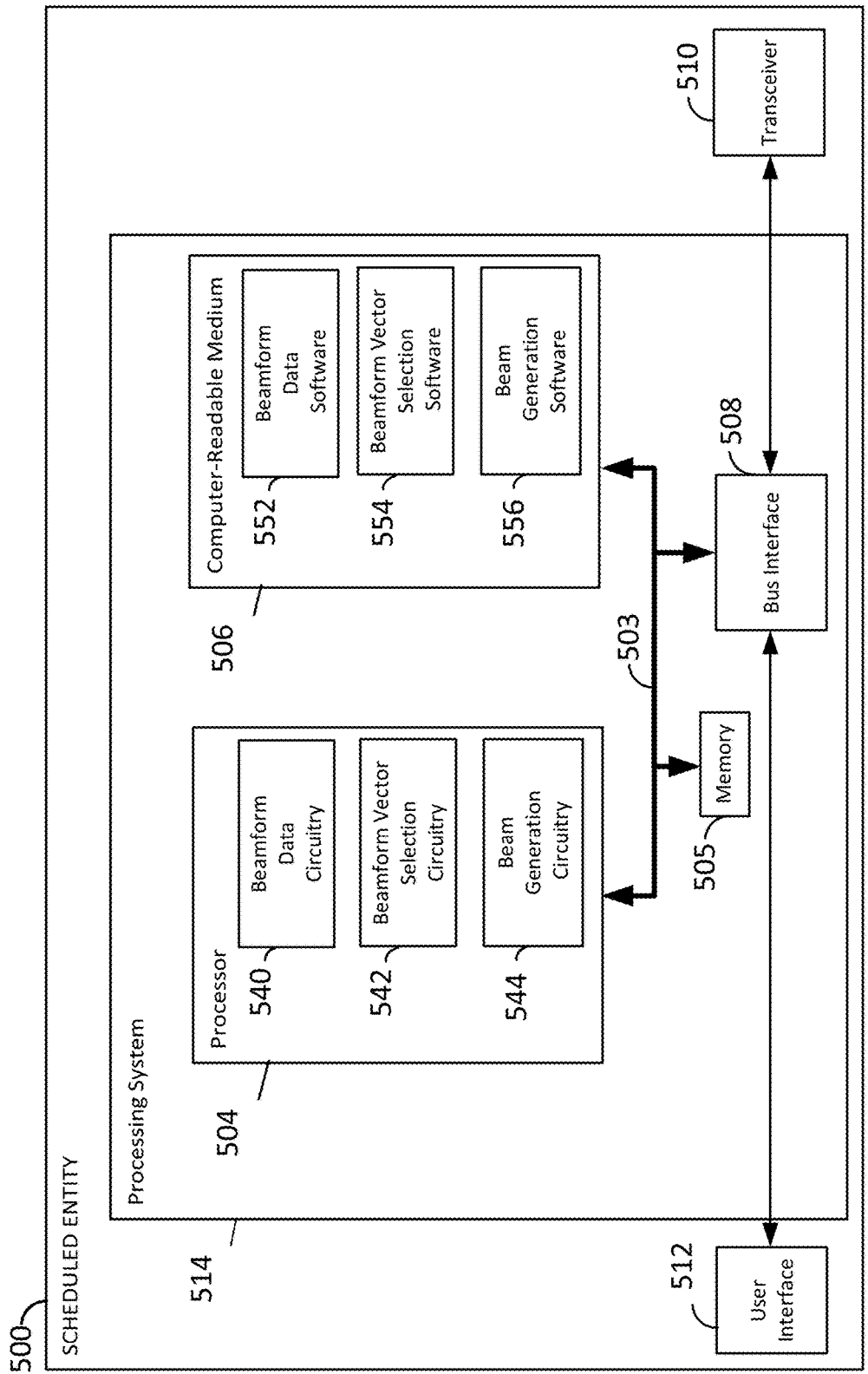
FIG. 5 is a block diagram illustrating an example of a hardware implementation for a scheduled entity employing a processing system.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of the FIGs. disclosed herein.

The processing system 514 may be substantially the same as the processing system 314 illustrated in FIG. 3, including a bus interface 508, a bus 502, memory 505, a processor 504, and a computer-readable medium 506. Furthermore, the scheduled entity 500 may include a user interface 512 and a transceiver 510 substantially similar to those described above in FIG. 3. That is, the processor 504, as utilized in a scheduled entity 500, may be used to implement any one or more of the processes described below and illustrated in the various figures.

In some aspects of the disclosure, the processor 504 may include a beamform data circuitry 540 configured for various functions, including, for example, to receive beamform data via a network from a scheduling entity, wherein the beamform data corresponds to a mapping of a path between a vehicle UE (e.g., scheduled entity 500) and a base station or another vehicle. As illustrated, the processor 504 may also include beamform vector selection circuitry 542 configured for various functions. For instance, beamform vector selection circuitry 542 may be configured to select a beamform vector based on the beamform data received from the scheduling entity. Here, it is contemplated that the beamform vector includes a respective phase and amplitude corresponding to each of a plurality of antennas coupled to the vehicle UE. The processor 504 may further include beam generation circuitry 544 configured for various functions, including, for example, to generate a beam in accordance with the beamform vector such that the beam has a direction consistent with the path between the vehicle UE and the base station or another vehicle. To this end, it should be appreciated that, the combination of the beamform data circuitry 540, the beamform vector selection circuitry 542, and the beam generation circuitry 544 may be configured to implement one or more of the functions described herein.

Various other aspects for scheduled entity 500 are also contemplated. For instance, examples are disclosed in which the beamform data further includes data corresponding to at least one mapping of an alternative path. Within such embodiment, the beamform vector selection circuitry 542 is configured to select between a plurality of mappings respectively corresponding to a plurality of different paths between the vehicle UE and the base station or another vehicle. The beamform vector selection circuitry 542 may then be configured to select between the plurality of mappings in any of various ways. In a particular example, the beamform vector selection circuitry 542 may be configured to select between the plurality of mappings based on a prioritization of the plurality of mappings included in the beamform data received from the scheduled entity. Alternatively, the beamform vector selection circuitry 542 may be configured to select between the plurality of mappings based on real-time data collected by the vehicle UE (e.g., a signal-to-noise ratio associated with a communication between the vehicle UE and the base station or another vehicle).

In another aspect of the disclosure, it is contemplated that the beamform vector selection circuitry 542 may be configured to adjust the beamform vector based on real-time data collected by the vehicle UE, such as a real-time measurement of a communication between the vehicle UE and the base station or another vehicle (e.g., a signal-to-noise ratio). Alternatively, the beamform vector selection circuitry 542 may be configured to adjust the beamform vector by utilizing a topological map of objects proximate to the vehicle UE to determine an indirect path between the vehicle UE and the base station or another vehicle. For instance, the scheduled entity 500 may be configured to ascertain the indirect path based on a ray tracing result (discussed in greater detail below with reference to FIG. 12), wherein the indirect path comprises at least one reflection off an object included in the topological map.

In yet another aspect of the disclosure, as previously stated, it is contemplated that a scheduling entity may be configured to crowdsource a database of beamform data according to data associated with previous beam transmissions from various vehicles. To facilitate such embodiment, it is contemplated that the transceiver 510 may be configured to transmit data corresponding to an adjustment of the beamform vector to the scheduling entity.

Similar to processor 304, processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. Similar to computer-readable medium 306, computer-readable medium 506 may be a non-transitory computer-readable medium comprising characteristics that are substantially similar. The computer-readable medium 506 may reside in the processing system 514, external to the processing system 514, or distributed across multiple entities including the processing system 514. It should also be appreciated that, similar to computer-readable medium 306, computer-readable medium 506 may be embodied in a computer program product comprising characteristics that are substantially similar.

In one or more examples, the computer-readable storage medium 506 may include beamform data software 552 configured for various functions, including, for example, to receive beamform data via a network from a scheduling entity, wherein the beamform data corresponds to a mapping of a path between a vehicle UE (e.g., scheduled entity 500) and a base station or another vehicle. As illustrated, the computer-readable medium 506 may also include beamform vector selection software 554 configured for various functions. For instance, beamform vector selection software 554 may be configured to select a beamform vector based on the beamform data received from the scheduling entity. Here, it is contemplated that the beamform vector includes a respective phase and amplitude corresponding to each of a plurality of antennas coupled to the vehicle UE. The computer-readable medium 506 may further include beam generation software 556 configured for various functions, including, for example, to generate a beam in accordance with the beamform vector such that the beam has a direction consistent with the path between the vehicle UE and the base station or another vehicle. To this end, it should be appreciated that, the combination of the beamform data software 552, the beamform vector selection software 554, and the beam generation software 556 may be configured to implement one or more of the functions described herein.

It should also be appreciated that the computer-readable medium 506 may be configured to implement various other functions described herein. For instance, as previously stated, examples are disclosed in which the beamform data received from the scheduling entity further includes data corresponding to at least one mapping of an alternative path. Within such embodiment, the beamform vector selection software 554 is configured to select between a plurality of mappings respectively corresponding to a plurality of different paths between the vehicle UE and the base station or another vehicle. The beamform vector selection software 554 may then be configured to select between the plurality of mappings in any of various ways. In a particular example, the beamform vector selection software 554 may be configured to select between the plurality of mappings based on a prioritization of the plurality of mappings included in the beamform data received from the scheduled entity. Alternatively, the beamform vector selection software 554 may be configured to select between the plurality of mappings based on real-time data collected by the vehicle UE (e.g., a signal-to-noise ratio associated with a communication between the vehicle UE and the base station or another vehicle).

In another aspect of the disclosure, it is contemplated that the beamform vector selection software 554 may be configured to adjust the beamform vector based on real-time data collected by the vehicle UE, such as a real-time measurement of a communication between the vehicle UE and the base station or another vehicle (e.g., a signal-to-noise ratio). Alternatively, the beamform vector selection software 554 may be configured to adjust the beamform vector by utilizing a topological map of objects proximate to the vehicle UE to determine an indirect path between the vehicle UE and the base station or another vehicle. For instance, the scheduled entity 500 may be configured to ascertain the indirect path based on a ray tracing result (discussed in greater detail below with reference to FIG. 12), wherein the indirect path comprises at least one reflection off an object included in the topological map.

In yet another aspect of the disclosure, as previously stated, it is contemplated that a scheduling entity may be configured to crowdsource a database of beamform data according to data associated with previous beam transmissions from various vehicles. To facilitate such embodiment, it is contemplated that the computer-readable medium 506 may be configured to transmit data corresponding to an adjustment of the beamform vector to the scheduling entity via the transceiver 510.

In a particular configuration, it is also contemplated that the scheduled entity 500 includes means for receiving beamform data, means for selecting a beamform vector based on the beamform data, and means for generating a beam in accordance with the beamform vector. In one aspect, the aforementioned means may be the processor(s) 504 configured to perform the functions recited by the aforementioned means. In another aspect, the aforementioned means may be a circuit or any apparatus configured to perform the functions recited by the aforementioned means.

Figure 6:
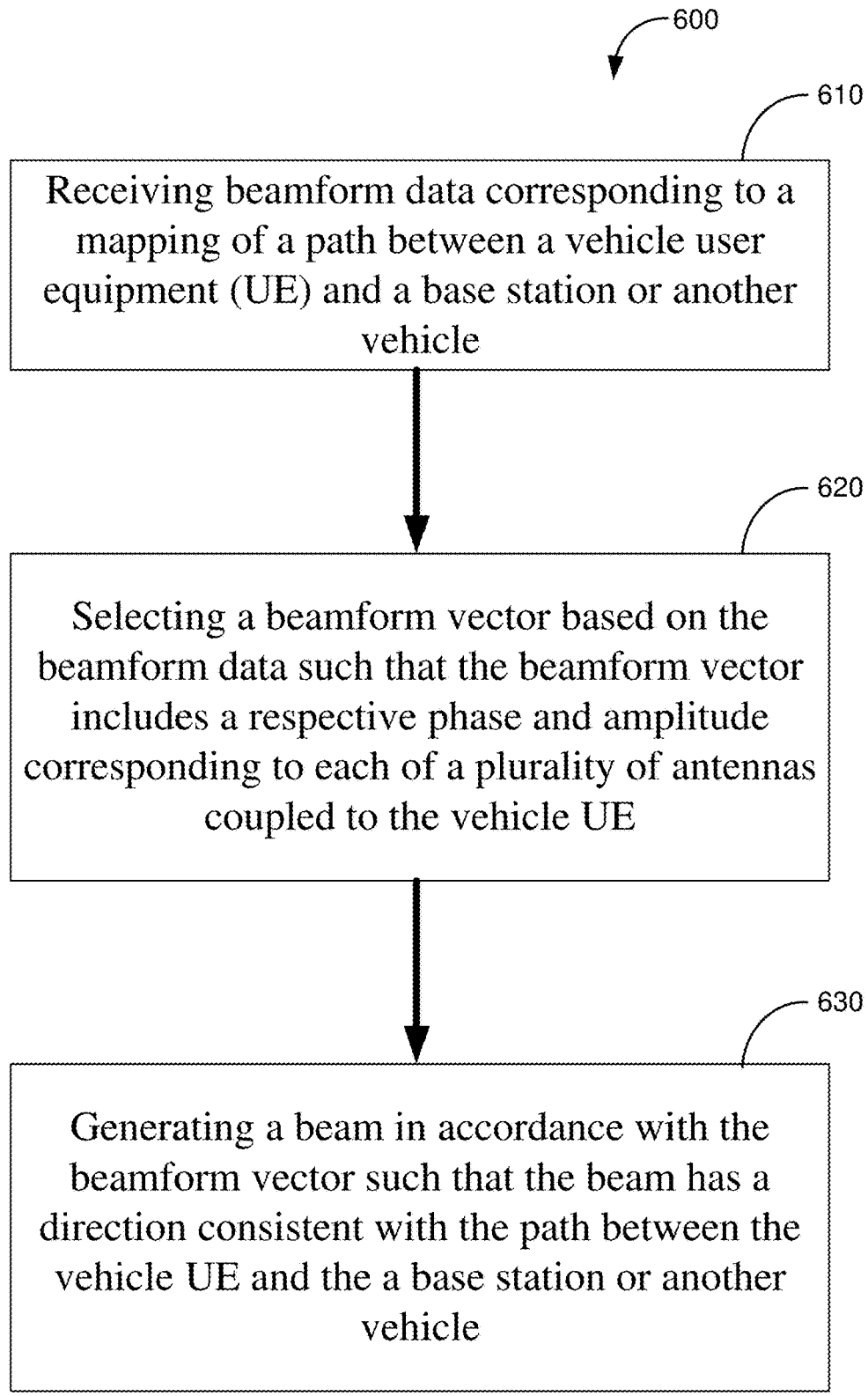
FIG. 6 is a flow chart illustrating an exemplary scheduled entity process that facilitates maintaining a database of beamform data according to some aspects of the disclosure.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described herein, and utilizing, for example, the processes and/or algorithms described in relation to FIG. 6.

In FIG. 6, a flow chart is provided, which illustrates an exemplary scheduled entity process that facilitates maintaining a database of beamform data according to some aspects of the disclosure. As described below, some or all illustrated features may be omitted in a particular implementation within the scope of the present disclosure, and some illustrated features may not be required for implementation of all embodiments. In some examples, the process 600 may be carried out by the scheduled entity 500 illustrated in FIG. 5. In some examples, the process 600 may be carried out by any suitable apparatus or means for carrying out the functions or algorithm described below.

Process 600 begins at block 610 with the receiving of beamform data corresponding to a mapping of a path between a vehicle UE (e.g., scheduled entity 500) and a base station or another vehicle. After receiving the beamform data at block 610, process 600 proceeds to block 620 where a beamform vector is selected based on the beamform data such that the beamform vector includes a respective phase and amplitude corresponding to each of a plurality of antennas coupled to the vehicle UE. Process 600 then concludes at block 630 where a beam is generated in accordance with the beamform vector such that the beam has a direction consistent with the path between the vehicle UE and the base station or another vehicle.

Various other aspects of process 600 are also contemplated. For instance, as previously stated, aspects are disclosed in which the beamform data received at block 610 further includes data corresponding to at least one mapping of an alternative path. Within such embodiment, the selection performed at block 620 comprises selecting between a plurality of mappings respectively corresponding to a plurality of different paths between the vehicle UE and the base station or another vehicle, wherein the selection performed at block 620 may be performed in any of various ways. For instance, in a particular example, the selection performed at block 620 is based on a prioritization of the plurality of mappings included in the beamform data received from the scheduled entity. Alternatively, the selection performed at block 620 may be based on real-time data collected by the vehicle UE (e.g., a signal-to-noise ratio associated with a communication between the vehicle UE and the base station or another vehicle).

In another aspect of the disclosure, it is contemplated that the selection performed at block 620 may further include adjusting the beamform vector based on real-time data collected by the vehicle UE, such as a real-time measurement of a communication between the vehicle UE and the base station or another vehicle (e.g., a signal-to-noise ratio). Alternatively, the selection performed at block 620 may further include adjusting the beamform vector by utilizing a topological map of objects proximate to the vehicle UE to determine an indirect path between the vehicle UE and the base station or another vehicle. For instance, process 600 may comprise ascertaining the indirect path based on a ray tracing result (discussed in greater detail below with reference to FIG. 12), wherein the indirect path comprises at least one reflection off an object included in the topological map.

As previously stated, it is also contemplated that a scheduling entity may be configured to crowdsource a database of beamform data according to data associated with previous beam transmissions from various vehicles. To facilitate such embodiment, it is contemplated that process 600 may further comprise transmitting data corresponding to an adjustment of the beamform vector to the scheduling entity (e.g., via transceiver 510).

Exemplary Implementations

Figure 7:
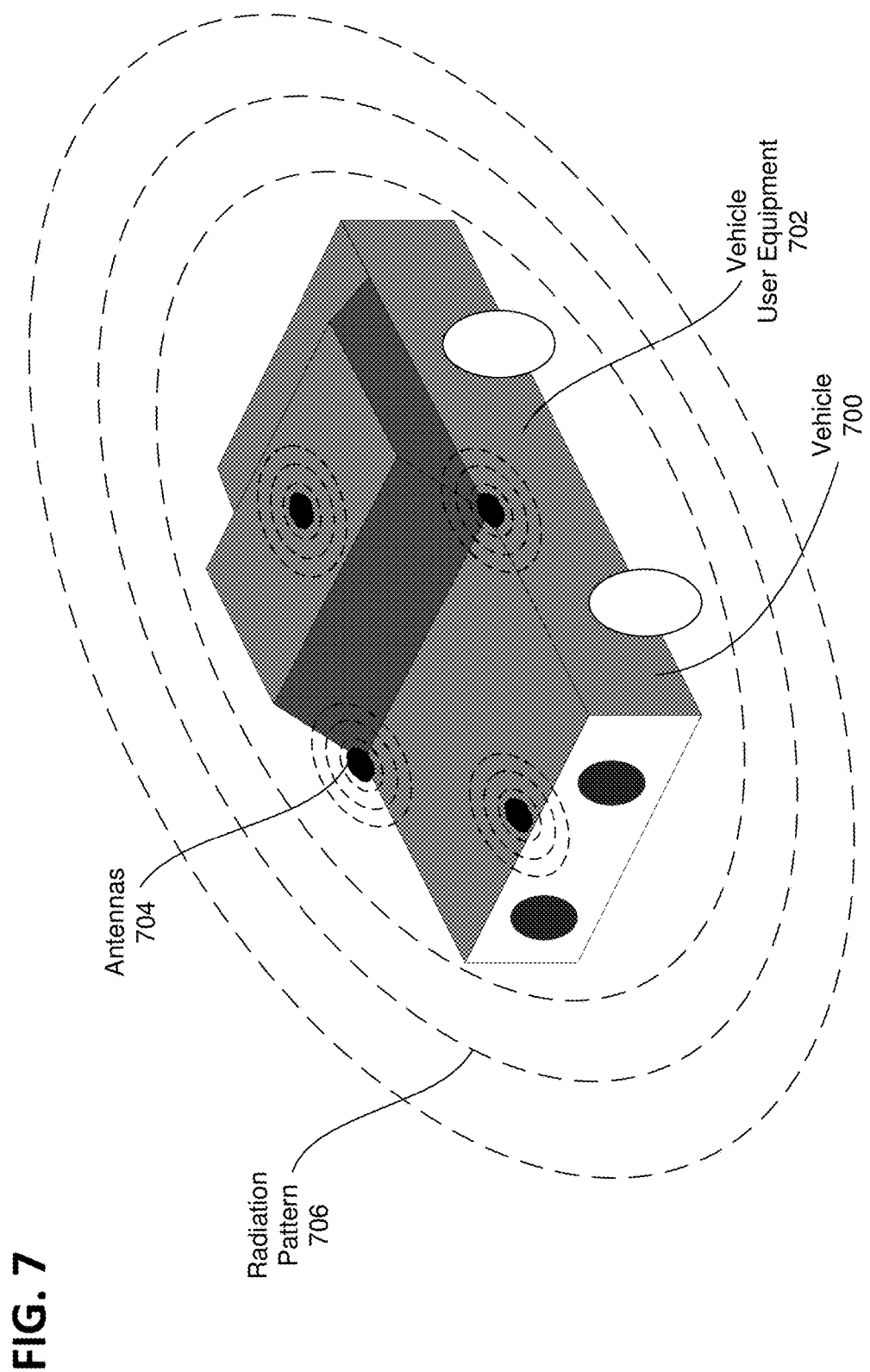
FIG. 7 is a schematic illustration of an exemplary vehicle UE generating a conventional radiation pattern.

Referring next to FIGS. 7-14, various exemplary implementations of the beamforming aspects disclosed herein are provided. As previously stated, a vehicle user equipment (UE) has several distinctive features relative to handheld devices including, for example, a large form factor that can be equipped with more antennas than handheld devices. Indeed, as illustrated in FIG. 7, a vehicle 700 may be include a vehicle UE 702 comprising a plurality of antennas 704 placed on the rooftop, hood, and left/right mirrors. With such a configuration, the vehicle UE 702 may generate a conventional radiation pattern 706 via the plurality of antennas 704, as shown.

Figure 8:
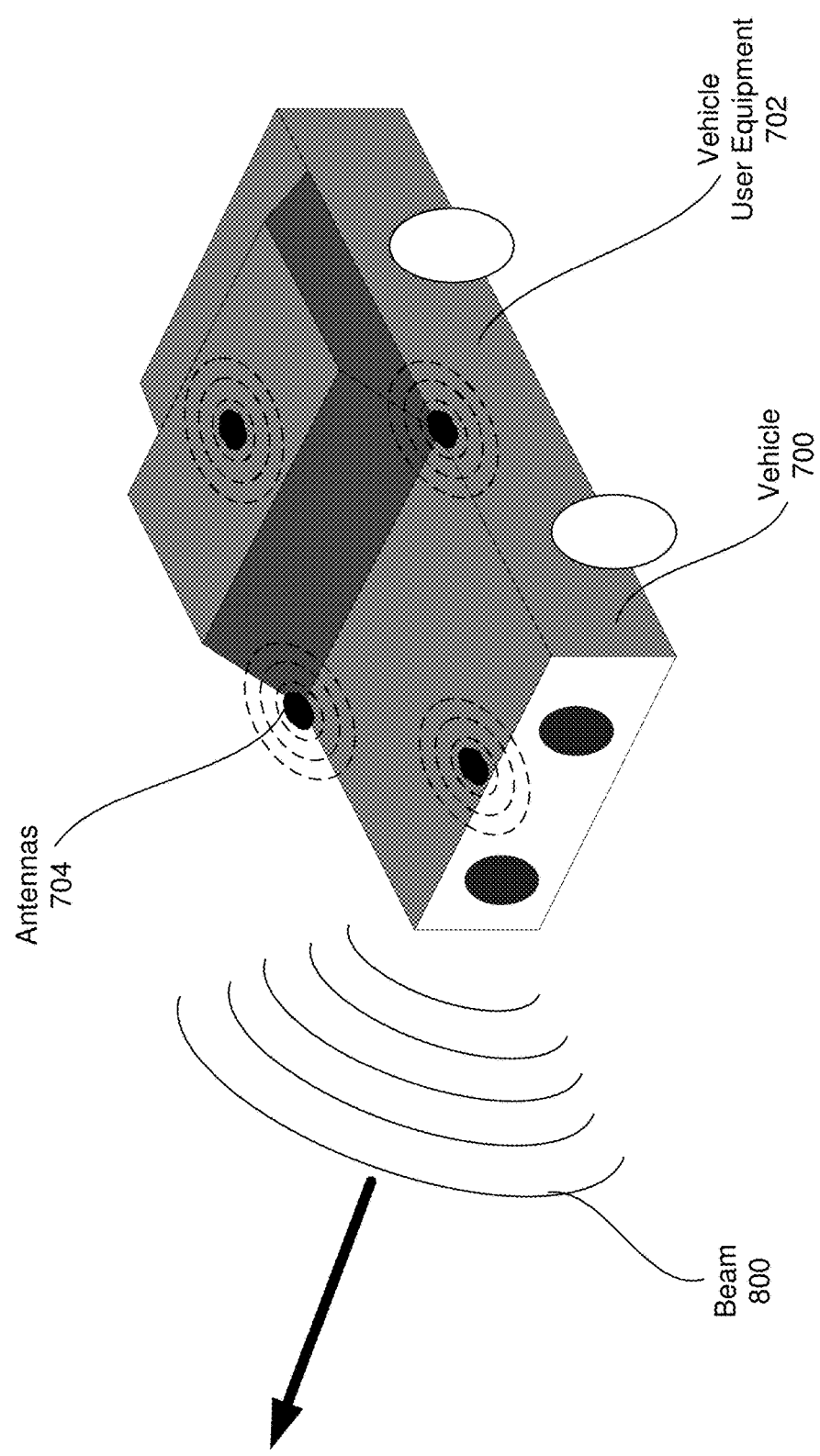
FIG. 8 is a schematic illustration of an exemplary vehicle UE generating a beam according to some aspects of the present disclosure.
Figure 9:
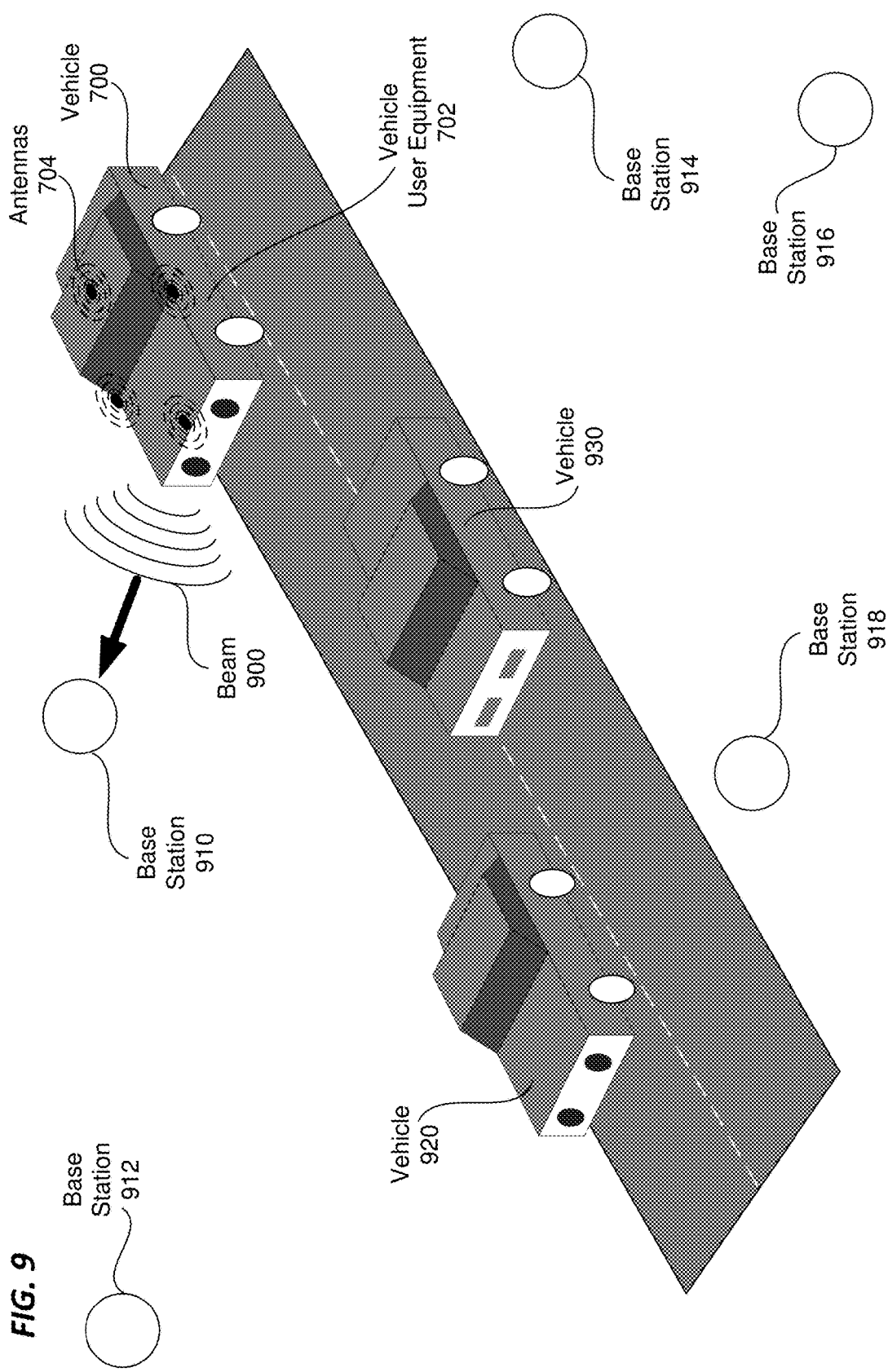
FIG. 9 is an exemplary environment illustrating a beam directed towards a first base station according to some aspects of the present disclosure.

In order to provide a more reliable signal, however, the vehicle UE 702 may be configured to utilize beamforming techniques to generate a beam 800 directed towards a particular direction, as illustrated in FIG. 8. To change the direction of the beam 800, the vehicle UE 702 controls the phase and relative amplitude of the signal at each of the plurality of antennas 704, in order to create a pattern of constructive and destructive interference in the wavefront. Since the vehicle UE 702 knows the position, speed, and future trajectory of the vehicle 700, this information can be utilized to improve beamforming when communicating with a base station. For example, if the vehicle UE 702 is further equipped with a map of the deployed base stations, then the vehicle UE 702 may also know the position of the base station it is communicating with. With respect to FIGS. 9-12, for instance, the vehicle UE 702 may be equipped with a map of base stations 910, 912, 914, 916, and 918. Based on the relative position between the vehicle UE 702 and a particular base station, the vehicle UE 702 can adjust the respective amplitudes and phases of the signals transmitted by the plurality of antennas 704 (i.e., the "beamforming vector") such that the particular base station the vehicle UE 702 is communicating with receives the strongest combined signal. In FIG. 9, for example, the vehicle UE 702 generates a beam 900 directed towards base station 910. Here, it should be noted that the mapping between the beamforming vector and the resulting radiation pattern (i.e., the pattern of combined signal strengths in different directions) can be measured and determined beforehand by the vehicle UE 702 (e.g., mapping may be stored in a lookup table). When communicating with a base station, the appropriate beamforming vector may then be chosen based on the relative position of the base station and the vehicle 700.

Figure 10:
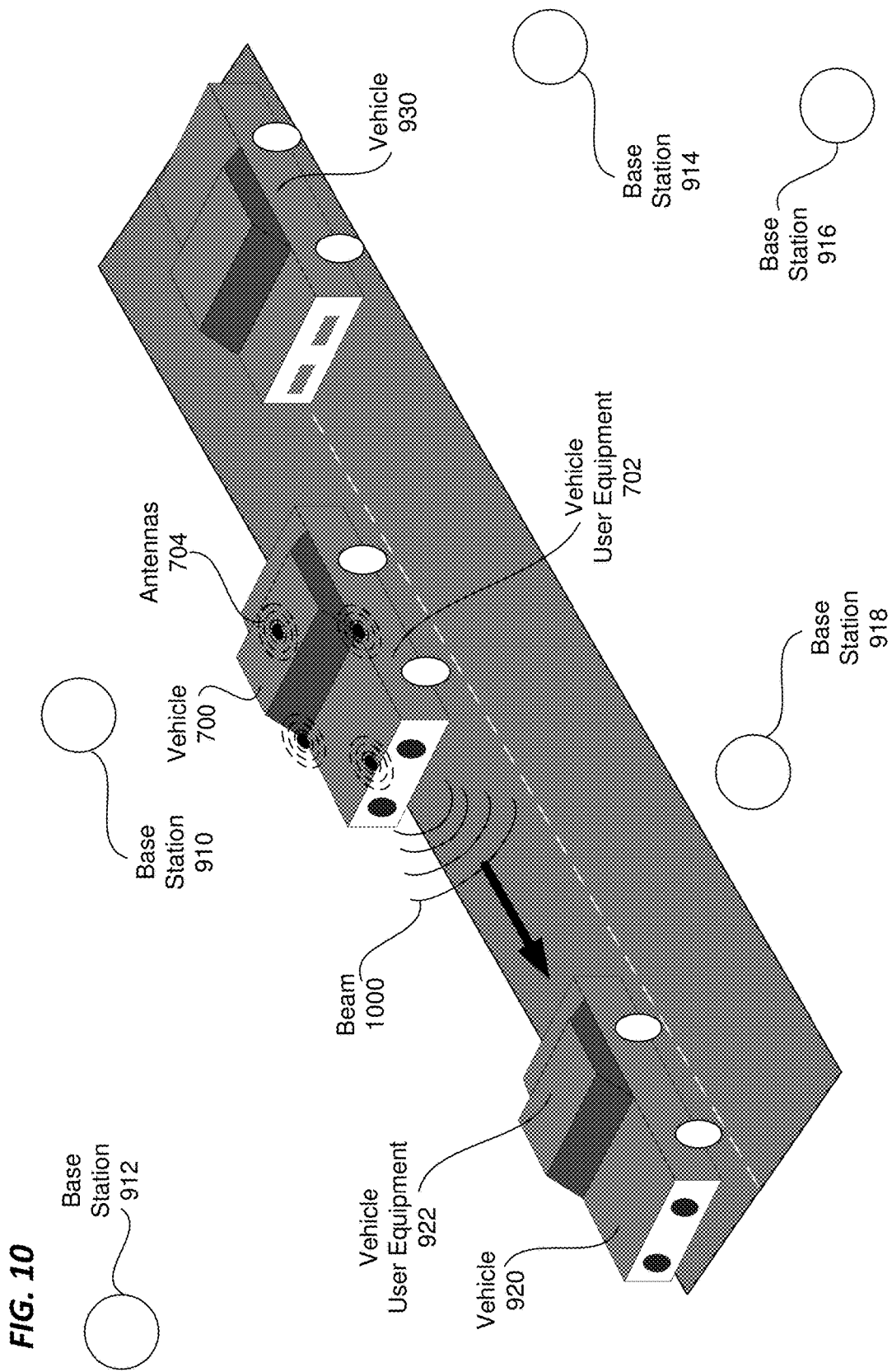
FIG. 10 is an exemplary environment illustrating a beam directed towards another vehicle according to some aspects of the present disclosure.
Figure 11:
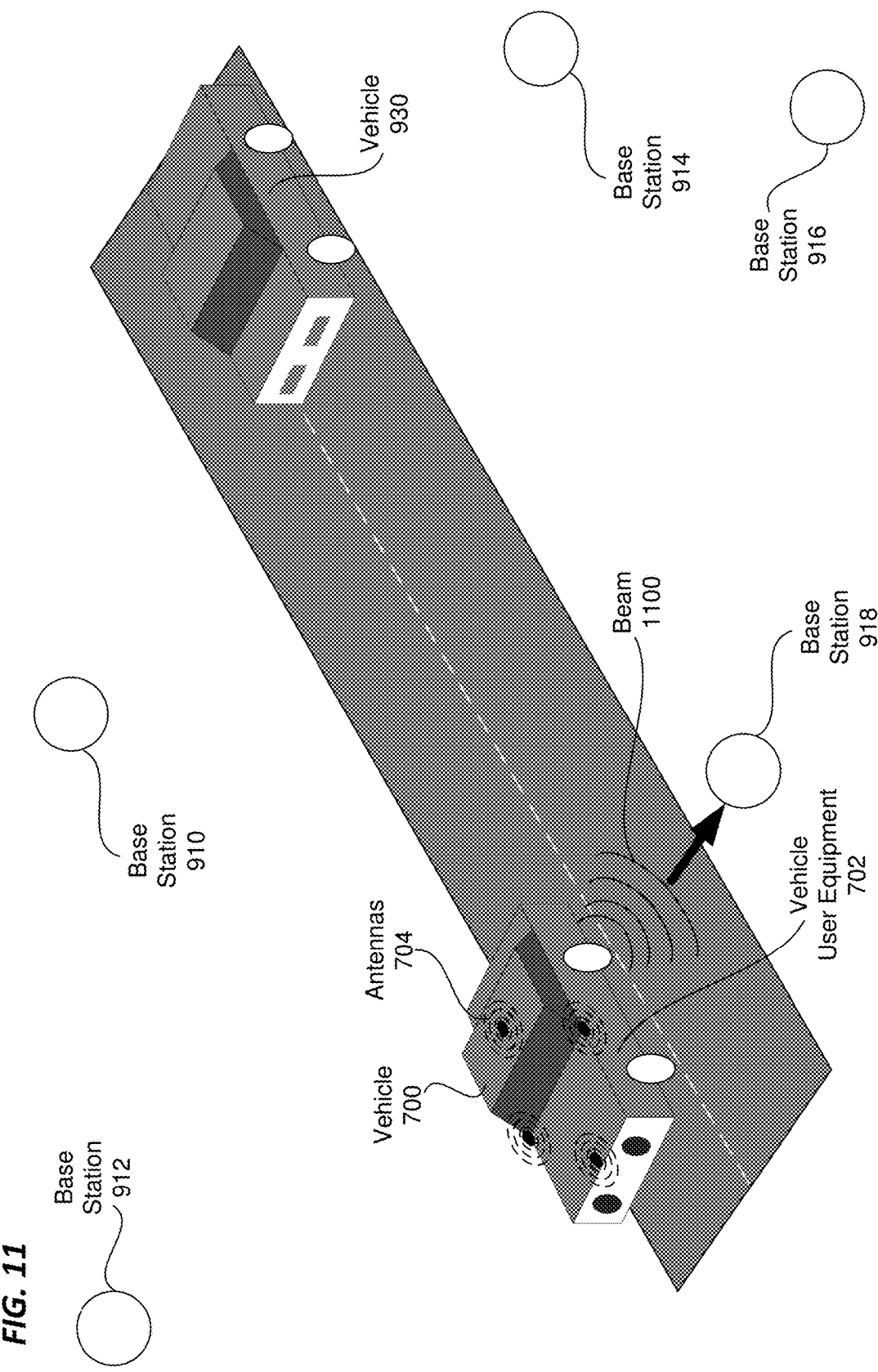
FIG. 11 is an exemplary environment illustrating a beam directed towards a second base station according to some aspects of the present disclosure.

In an aspect of the disclosure, it is contemplated that these beamforming techniques can be naturally extended to communications with a second vehicle UE, as illustrated in FIG. 10. Within such embodiment, it should be appreciated that the vehicle UE 702 may know the position of a second vehicle 920 or 930 via vehicle-to-vehicle communications (e.g., where each vehicle UE broadcasts information of its position, speed, etc.) or via computer vision using a camera. If the vehicle UE 702 needs to communicate specifically to a second vehicle UE, it can beamform its transmission by using a proper beamforming vector. In FIG. 10, for instance, the vehicle UE 702 may communicate with vehicle UE 922 via beam 1000, as shown, wherein such communication may be in accordance with a collision avoidance system. In FIG. 11, the vehicle UE 702 is then shown generating beam 1100, which is directed towards base station 918.

Figure 12:
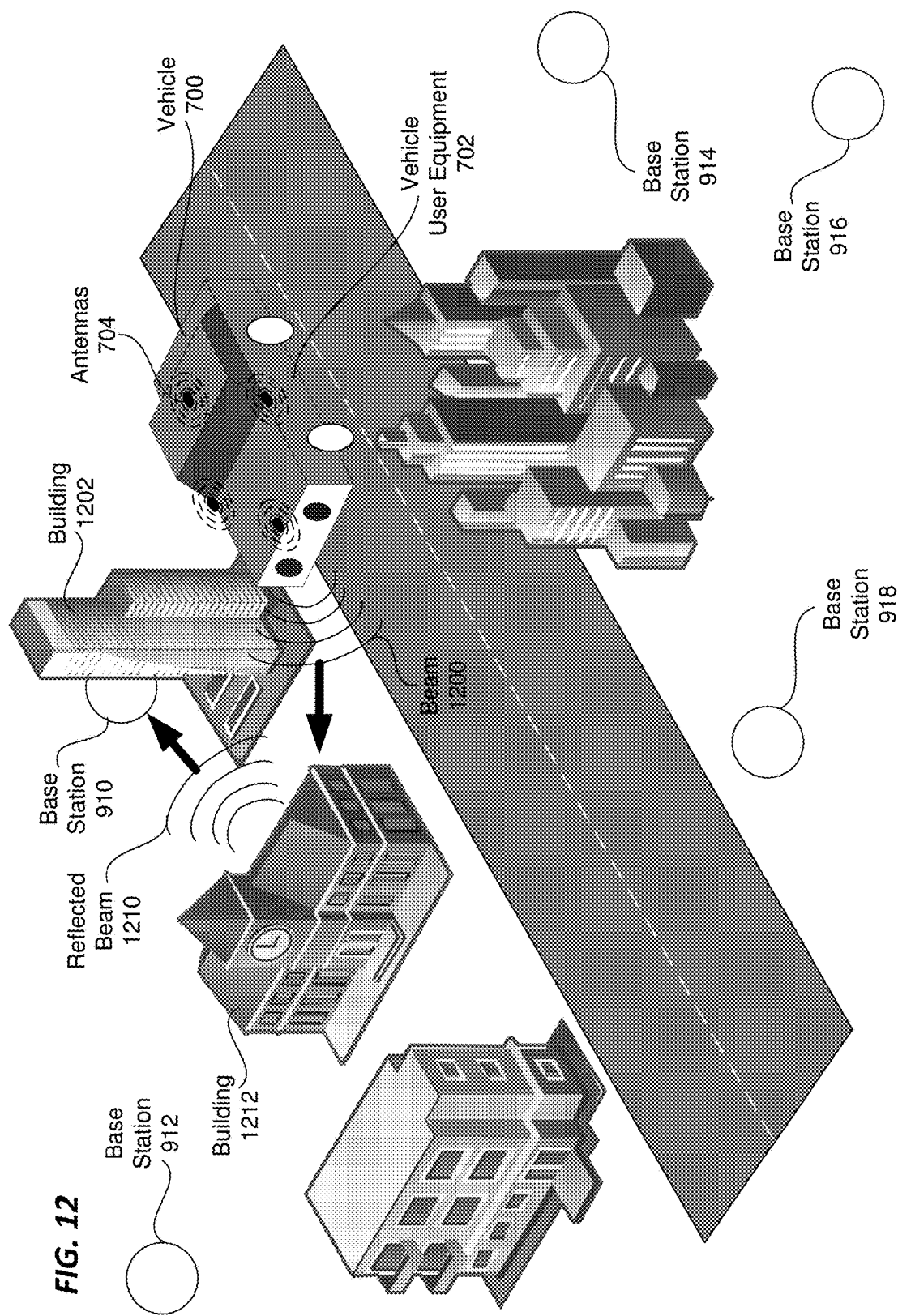
FIG. 12 is an exemplary environment illustrating a reflected beam corresponding to an indirect path towards a base station according to some aspects of the present disclosure.

In yet another aspect of the disclosure, it is contemplated that the vehicle UE 702 may be configured to use a topological map of the area to perform "ray tracing" between itself and base stations/other vehicles to tune the beamforming vectors accordingly. Here, it should be appreciated that ray tracing is a method for calculating the path of waves or particles through a system with regions of varying propagation velocity, absorption characteristics, and reflecting surfaces. Under these circumstances, wavefronts may bend, change direction, or reflect off surfaces, complicating analysis. Ray tracing solves this problem by repeatedly advancing idealized narrow beams called rays through the medium by discrete amounts. Simple problems can be analyzed by propagating a few rays using simple mathematics. More detailed analyses can be performed by using a computer to propagate multiple rays. Therefore, given a detailed map of major objects (such as buildings) in a particular area, ray tracing analysis can be done by taking into account the topology and surface properties of the objects. For example, in a complex surrounding, the vehicle UE 702 can analyze the received strength of a ray (transmitted towards a particular direction) through commercially available ray-tracing simulation software. In FIG. 12, for instance, the vehicle UE 702 may be equipped with a topological map of the environment, wherein the vehicle UE 702 knows that a building 1202 is obstructing it from base station 910. In response, the vehicle UE 702 ascertains an indirect path to the base station 910, wherein a beam 1200 generated by the vehicle UE 702 is directed towards another building 1212 so as to create a reflected beam 1210 directed towards the base station 910.

Figure 13:
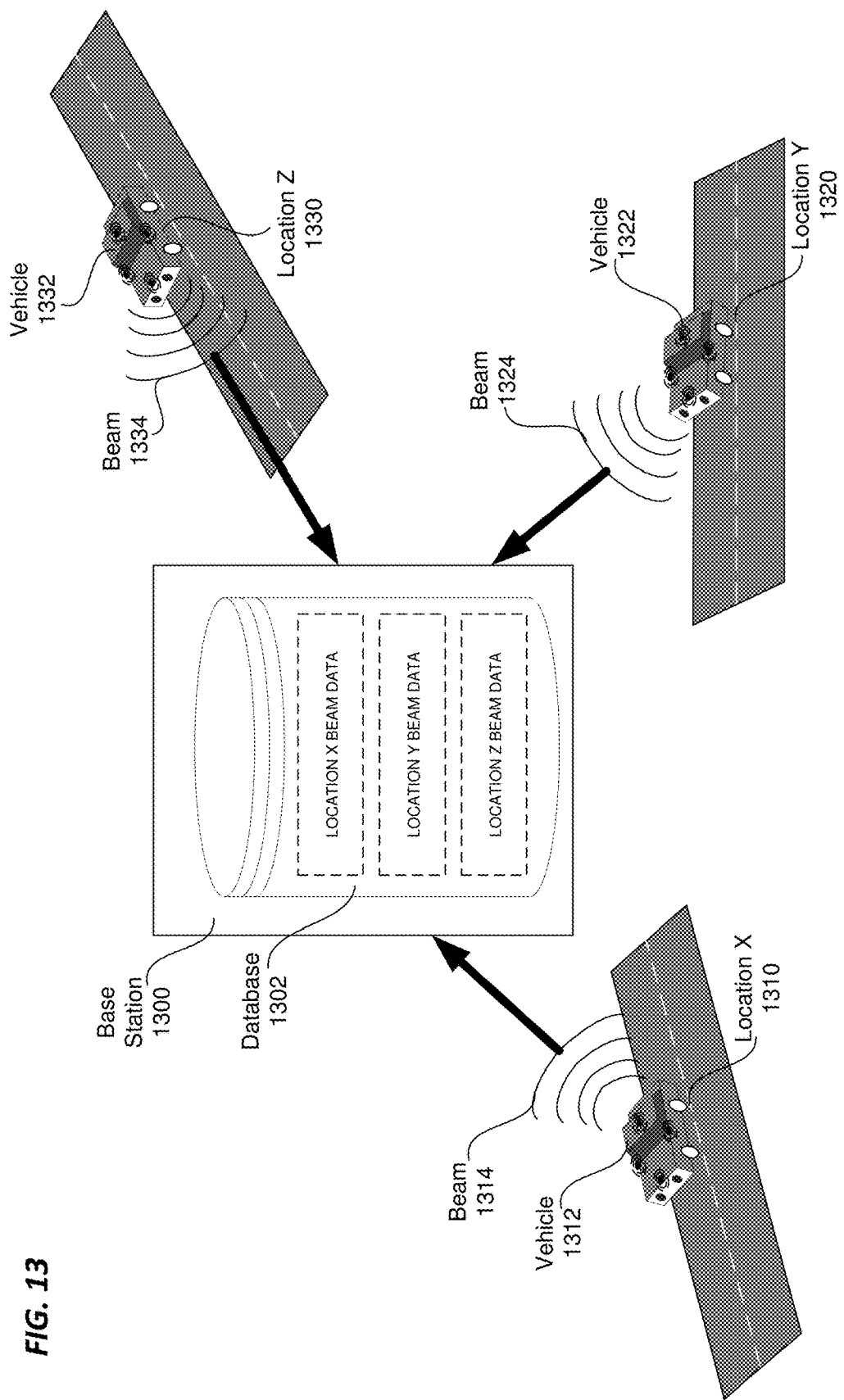
FIG. 13 is a schematic illustration of an exemplary gathering of beamforming data according to some aspects of the present disclosure.
Figure 14:
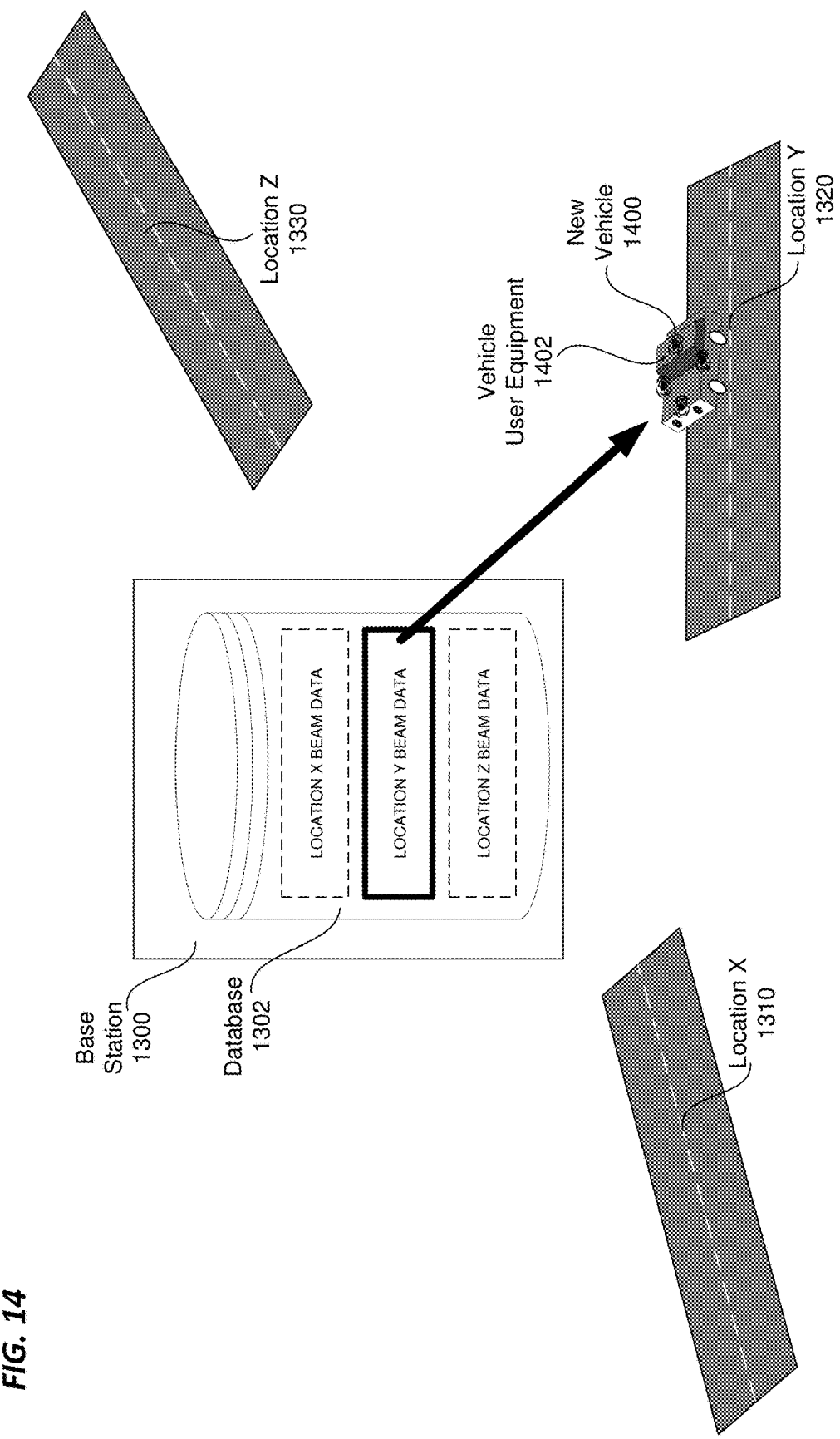
FIG. 14 is a schematic illustration of an exemplary dissemination of beamforming data according to some aspects of the present disclosure.

Referring next to FIGS. 13-14, further exemplary implementations are provided for facilitating the disclosed beamforming techniques. Here, it is contemplated that a vehicle UE may periodically provide a base station with various types of information including, for example, its location, its antenna configuration parameters, its beamforming vector and beamforming directions. As illustrated, a base station 1300 collects such data from various locations 1310, 1320, and 1330, which it then stores in a database 1302. For this particular example, vehicle 1312 transmits data associated with location X 1310 through beam 1314; vehicle 1322 transmits data associated with location Y 1320 through beam 1324; and vehicle 1332 transmits data associated with location Z 1330 through beam 1334. (NOTE: the base station 1300 can alternatively obtain location information from Basic Safety Messages transmitted by the vehicle UEs.).

Subsequently, a new vehicle can get data from the base station 1300 corresponding to its particular location. For instance, as illustrated in FIG. 14, a new vehicle 1400 equipped with vehicle user equipment 1402 receives beam data associated with location Y 1320. The vehicle user equipment 1402 may use this data to ascertain an initial beamforming vector, which could then be refined based on its real time measurement of the signal from the base station 1300. Such refinement can then be relayed back to the base station 1300 and stored in the database 1302. This is essentially a form of crowd-sourcing to perfect beamforming settings for different vehicle positions on the road, under different weather conditions, etc. Using this approach, the vehicle user equipment 1402 itself may not need to know the location of the base station 1300.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication comprising:
receiving beamform data via a network from a scheduling entity, the beamform data corresponding to a mapping of a path between a vehicle user equipment (UE) and a base station or another vehicle;
selecting a beamform vector based on the beamform data received from the scheduling entity, the beamform vector including a respective phase and amplitude corresponding to each of a plurality of antennas coupled to the vehicle UE, wherein the selecting further comprises adjusting the beamform vector; and
generating a beam in accordance with the beamform vector, the beam having a direction consistent with the path between the vehicle UE and the base station or another vehicle.

2. The method of claim 1, wherein the beamform data further includes data corresponding to at least one mapping of an alternative path, and wherein the selecting comprises selecting between a plurality of mappings respectively corresponding to a plurality of different paths between the vehicle UE and the base station or another vehicle.

3. The method of claim 2, wherein the selecting between the plurality of mappings is based on a prioritization of the plurality of mappings included in the beamform data.

4. The method of claim 2, wherein the selecting between the plurality of mappings is based on real-time data collected by the vehicle UE.

5. The method of claim 1, wherein the adjusting the beamform vector is based on real-time data collected by the vehicle UE.

6. The method of claim 5, further comprising transmitting an adjustment of the beamform vector to the scheduling entity.

7. The method of claim 5, wherein the adjusting the beamform vector comprises utilizing a topological map of objects proximate to the vehicle UE to determine an indirect path between the vehicle UE and the base station or another vehicle, the indirect path based on a ray tracing result and comprising at least one reflection off an object included in the topological map.

8. The method of claim 5, wherein the adjusting the beamform vector is based on a real-time measurement of a communication between the vehicle UE and the base station or another vehicle.

9. A wireless communication device comprising:
a processor;
a memory communicatively coupled to the processor;
a transceiver communicatively coupled to the processor;
a beamform data circuitry communicatively coupled to the processor, wherein the beamform data circuitry is configured to receive beamform data via a network from a scheduling entity, the beamform data corresponding to a mapping of a path between a vehicle user equipment (UE) and a base station or another vehicle;
a beamform vector selection circuitry communicatively coupled to the processor, wherein the beamform vector selection circuitry is configured to select a beamform vector based on the beamform data received from the scheduling entity, the beamform vector including a respective phase and amplitude corresponding to each of a plurality of antennas coupled to the vehicle UE, wherein the beamform vector selection circuitry is further configured to adjust the beamform vector; and
a beam generation circuitry communicatively coupled to the processor, wherein the beam generation circuitry is configured to generate a beam in accordance with the beamform vector, the beam having a direction consistent with the path between the vehicle UE and the base station or another vehicle.

10. The wireless communication device of claim 9, wherein the beamform data further includes data corresponding to at least one mapping of an alternative path, and wherein the beamform vector selection circuitry is configured to select between a plurality of mappings respectively corresponding to a plurality of different paths between the vehicle UE and the base station or another vehicle.

11. The wireless communication device of claim 10, wherein the beamform vector selection circuitry is configured to select between the plurality of mappings based on a prioritization of the plurality of mappings included in the beamform data.

12. The wireless communication device of claim 10, wherein the beamform vector selection circuitry is configured to select between the plurality of mappings based on real-time data collected by the vehicle UE.

13. The wireless communication device of claim 9, wherein the beamform vector selection circuitry is configured to adjust the beamform vector based on real-time data collected by the vehicle UE.

14. The wireless communication device of claim 13, wherein the transceiver is configured to transmit an adjustment of the beamform vector to the scheduling entity.

15. The wireless communication device of claim 13, wherein the beamform vector selection circuitry is configured to adjust the beamform vector by utilizing a topological map of objects proximate to the vehicle UE to determine an indirect path between the vehicle UE and the base station or another vehicle, the indirect path based on a ray tracing result and comprising at least one reflection off an object included in the topological map.

16. The wireless communication device of claim 13, wherein the beamform vector selection circuitry is configured to adjust the beamform vector based on a real-time measurement of a communication between the vehicle UE and the base station or another vehicle.

* * * * *